(12) United States Patent
Jain

(10) Patent No.: US 12,449,991 B2
(45) Date of Patent: Oct. 21, 2025

(54) HOST-INDEPENDENT FORMAT OPERATION OF USB-BASED STORAGE DEVICES

(71) Applicant: Sandisk Technologies, Inc., Milpitas, CA (US)

(72) Inventor: Nitin Jain, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 86 days.

(21) Appl. No.: 18/232,305

(22) Filed: Aug. 9, 2023

(65) Prior Publication Data

US 2024/0427509 A1  Dec. 26, 2024

Related U.S. Application Data

(60) Provisional application No. 63/522,675, filed on Jun. 22, 2023.

(51) Int. Cl.
*G06F 3/06* (2006.01)

(52) U.S. Cl.
CPC .......... *G06F 3/0632* (2013.01); *G06F 3/0604* (2013.01); *G06F 3/0679* (2013.01)

(58) Field of Classification Search
CPC .... G06F 3/0604; G06F 3/0632; G06F 3/0679; G06F 3/0644
USPC ................................. 711/166, 103
See application file for complete search history.

(56) References Cited

U.S. PATENT DOCUMENTS

| | | | |
|---|---|---|---|
| 8,191,120 B2 | 5/2012 | Baum et al. | |
| 2008/0177922 A1* | 7/2008 | Chow | G06F 11/2221 711/115 |
| 2009/0169070 A1* | 7/2009 | Fadell | G06F 21/32 382/124 |
| 2009/0327755 A1* | 12/2009 | Ikeda | G06F 21/62 711/E12.001 |
| 2011/0107040 A1* | 5/2011 | Hanes | H04L 41/0809 711/E12.001 |
| 2014/0317350 A1 | 10/2014 | Langas et al. | |
| 2015/0293705 A1* | 10/2015 | Kaiser | G06F 3/0631 711/102 |
| 2015/0294603 A1* | 10/2015 | Braunstein | G09F 7/04 315/86 |
| 2021/0123985 A1* | 4/2021 | Suzuki | G06F 13/4282 |

(Continued)

FOREIGN PATENT DOCUMENTS

| | | |
|---|---|---|
| JP | 2005092834 A | 4/2005 |
| JP | 2019028972 A | 2/2019 |
| KR | 20160129965 A | 11/2016 |

OTHER PUBLICATIONS

U.S. Appl. No. 18/232,310, filed Aug. 9, 2023.
U.S. Appl. No. 18/830,183, filed Sep. 10, 2024.

*Primary Examiner* — Hashem Farrokh
(74) *Attorney, Agent, or Firm* — Patterson + Sheridan, LLP

(57) ABSTRACT

Systems and methods are disclosed for providing host-independent format operations in data storage devices. In certain embodiments, a data storage device includes a non-volatile memory; a pinhole button configured to be pressed; and a controller configured to: detect that the pinhole button is pressed; detect that the data storage device is coupled to a direct-current (DC) power supply; and initiate formatting of the data storage device or a factory reset of the data storage device.

19 Claims, 8 Drawing Sheets

(56) References Cited

U.S. PATENT DOCUMENTS

2022/0066862 A1 3/2022 Zhang et al.
2024/0004559 A1* 1/2024 Lemberg ............... G06F 3/0679

* cited by examiner

HOST-INDEPENDENT FORMAT OPERATION OF USB-BASED STORAGE DEVICES

CROSS-REFERENCE TO RELATED APPLICATION(S)

This application claims the benefit of U.S. Provisional Patent Application No. 63/522,675, filed Jun. 22, 2023, entitled "HOST-INDEPENDENT FORMAT OPERATION OF USB-BASED STORAGE DEVICES," which is hereby expressly incorporated by reference herein in its entirety for all purposes.

BACKGROUND

Field

The present disclosure relates to data storage systems. In particular, the present disclosure relates to formatting of data storage devices.

Description of Related Art

Data storage devices can perform various data operations, including processing data requests from hosts. In some cases, data storage devices, such as Universal Serial Bus (USB) storage devices, may need to be formatted.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

DETAILED DESCRIPTION

Figure 1:
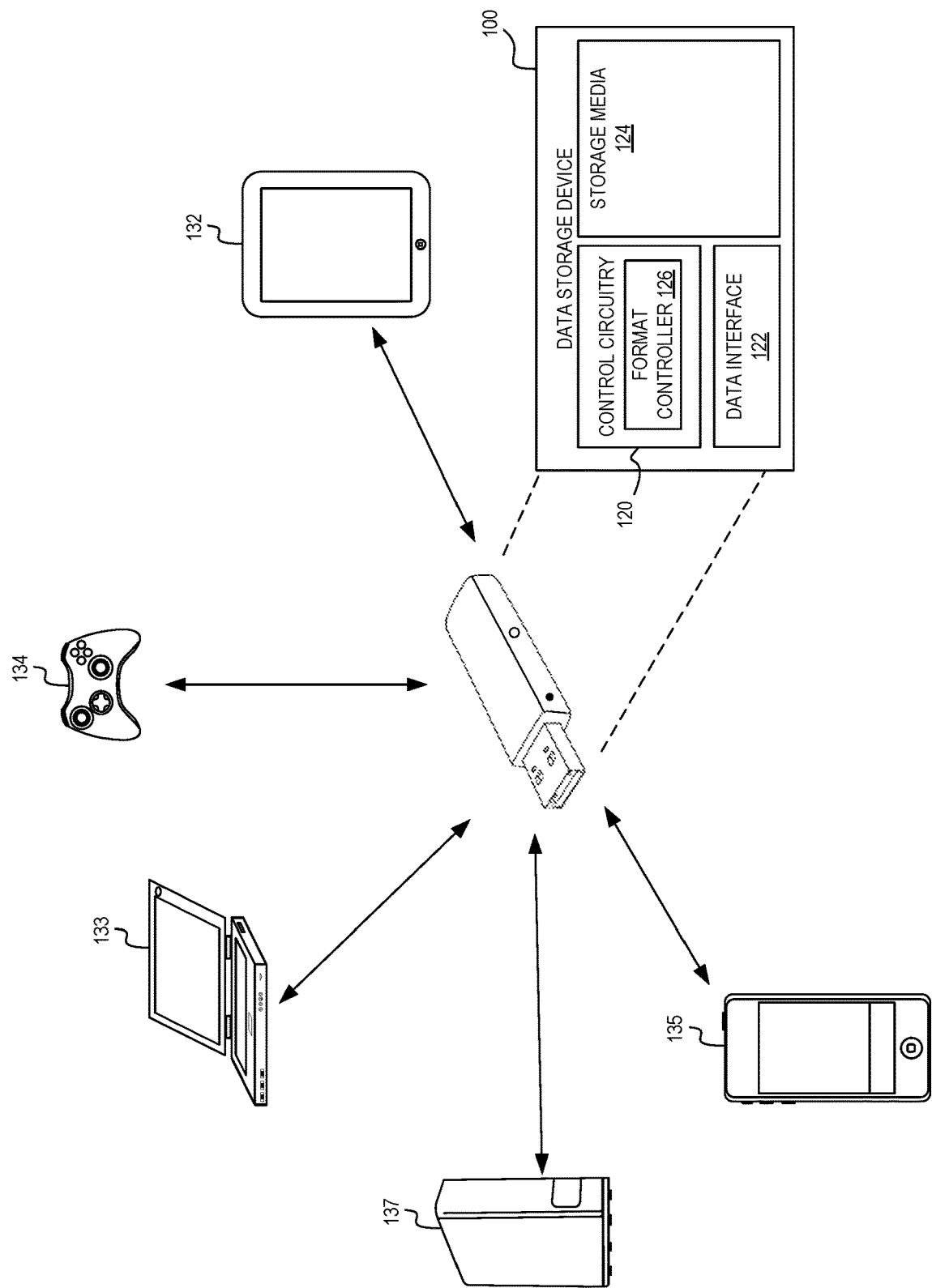
FIG. 1 illustrates an example data storage device relating to providing host-independent format operations, in accordance with one or more embodiments.

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

Host-Independent Format Operation of USB-Based Storage Devices

In many cases, a user may want to format a storage device to erase all content written to the storage device and to recover full capacity of the storage device. Examples of storage devices can include portable storage devices, such as USB flash drives or other USB devices. For instance, a user may want to format a USB flash drive to remove any virus or malware that has infected the drive. Or a user may want to format a USB flash drive when giving the drive to another user or after receiving the drive from another user. A user may also want to format a USB flash drive after using the drive on a public host device, which may be used by a number of people. In general, formatting a USB flash drive, involves connecting the drive to a host (e.g., a computer, a laptop, a mobile phone, etc.) and using features or options provided by the operating system (OS) (e.g., Windows, Android, IOS, etc.) or other third-party applications to format the drive. However, in some cases, a host may not be readily available, and if a user does not have immediate access to a host, the user may not be able to format the USB flash drive as desired.

In order to address these and other challenges, a storage device according to certain aspects can implement host-independent format operations. For example, a USB flash drive can include a pinhole button that can be pressed to initiate formatting of the drive without a connection to a host and without any instructions from a host, such as previously stored instructions. The drive can determine whether the drive is connected to a power supply, and if there is a sufficient power supply, the drive can initiate formatting when pressing of the pinhole button is detected. For instance, formatting or factory reset can be performed to remove data from the drive. Factory reset can include formatting and additional functionalities, such as deleting partitions and resetting user preferences. The USB flash drive can include an indicator, such as a light emitting diode (LED) indicator, that can show whether formatting is in progress or completed. In this way, a user can easily format a USB flash drive when needed without having access to a host, and host dependency for formatting can be eliminated. In many cases, hosts do not have antivirus software installed, and host-independent formatting can provide a convenient way of making sure the drive is safe to use and reduce risk of infecting hosts. Details relating to the storage device for providing host-independent format operations are provided below.

Data Storage Device

FIG. 1 is a diagram illustrating a data storage device 100 that provides host-independent format operations, according to certain embodiments. In some embodiments, the data storage device 100 includes control circuitry 120 for controlling the data storage device 100, a data interface 122, and non-volatile storage media 124. The control circuitry 120 can include hardware and/or software (e.g., firmware) for performing format operations on the storage media 124, such as a format controller 126. The format controller 126 may be implemented in firmware, which may be run on a controller chip. In some implementations, the format controller 126 may be a specialized, hardware-based chip for performing format operations. The control circuitry 120 can also include additional functionality. For example, the control circuitry 120 may support file-based storage. The control circuitry 120 can also include functionality for managing data transfers of the data storage device 100.

The data storage device 100 can employ a variety of storage technologies and/or form factors. For example, the data storage device 100 may be a solid-state drive (SSD), Secure Digital (SD) card, or a universal serial bus (USB) memory stick that uses semiconductor memory as the storage media 124. In other implementations, the data storage device 100 may be a hard disk drive (HDD) that uses magnetic disks as the storage media 124 or a solid-state hybrid drive (SSHD) that uses a combination of semiconductor memory and magnetic disk technology.

The storage media 124 can utilize various types of non-volatile memory (NVM) to permanently store data. NVM is a type of computer memory that can retain stored information even after power is removed. For example, the storage media 124 can include one or more magnetic disks and/or semiconductor memory. The semiconductor memory can include any of various memory technologies, such as NAND memory and its variations like SLC (Single Level Cell), eMLC (Enterprise Multi Level Cell), MLC (Multi Level Cell), TLC (Triple Level Cell), and QLC (Quadruple Level Cell). New types of emerging non-volatile memory could also be used such as Program in Place or Storage Class Memory (SCM) such as ReRam, Phase-Change Memory (PCM), and Magnetoresistive Random-Access Memory (MRAM).

The data storage device 100 can include a small amount of volatile memory, such as random-access memory (RAM) to serve as a cache for data. Such a cache can enable very fast access to data stored on it. In some embodiments, the data storage device 100 can also include a secondary non-volatile memory, in addition to the storage media 124. For example, the data storage device 100 can also include read-only memory (ROM), where firmware may be stored, and/or complementary metal-oxide semiconductor (CMOS) memory, where firmware settings may be stored.

In some embodiments, the control circuitry 120 is configured to manage semiconductor memory or magnetic technology. For example, the control circuitry 120 may include a memory or storage controller. In some embodiments, the control circuitry 120 is configured to manage the data interface 122. For example, the control circuitry 120 may include a USB controller. The control circuitry 120 can include an embedded processor, electrically erasable firmware ROM, RAM, error correction code (ECC) circuitry, head controller, voice coil motor (VCM) controller, and/or a host electrical interface such as Serial ATA (SATA), USB, Non-Volatile Memory Express (NVMe), or Serial-Attached SCSI (SAS).

The data interface 122 can include connectors, cables, and/or protocols for connection, communication, and/or power supply between host devices and the data storage device 100. In some embodiments, a port of the data interface 122 can enable transfer of both data and power to connected devices. In some embodiments, the data interface 122 comprises USB hardware and/or software. Various versions of USB can be used, such as USB 2.x, USB 3.x, or USB 4.x. The data interface 122 can include a physical port for coupling with connectors and cables. Various types of USB ports can be included on the data storage device, such as male or female Type A, Type B, Type C, mini, and/or micro connectors. Other data interface standards can also be used, such as external SATA (eSATA), ExpressCard, FireWire (IEEE 1394), and Thunderbolt. The data interface 122 can include a port for connecting with a cable or a corresponding port on the host device.

In some embodiments, the data storage device 100 lacks a battery. Instead, the data storage device 100 receives power, via the data interface 122, from a connected host or via a wall adapter (e.g., USB charger, alternating current (AC) to direct current (DC) converter, etc.) that can connect to mains electric power in a building. A USB port on the host device can provide both power and serve as a conduit for data transmission. For example, the data storage device 100 may connect via the USB port to the host system, which typically provides 5 volts (V) of DC power, though fast charging USB ports may provide higher voltages of DC power.

Various types of host devices can connect to the data storage device 100. Such host devices can include phones 135, such as smartphones, electronic appliances (not shown), smart televisions (TV's) (not shown), video game devices 134, laptop computers 133, tablet computers 132, desktop computers (not shown), wearable computers (not shown), wall-powered storage devices 137 (e.g., network attached storage or powered external drive) and/or other consumer electronic devices.

The data storage device 100 may be communicatively coupled to a host device via the data interface 122. The data storage device 100 may provide additional data storage to connected devices or facilitate transfer of data to other host devices. The data storage device 100 may be connected to a physical connection port (e.g., USB) on the host device, either directly (e.g., male port to female port) or via a cable.

Host-Independent Formatting

Figure 2:
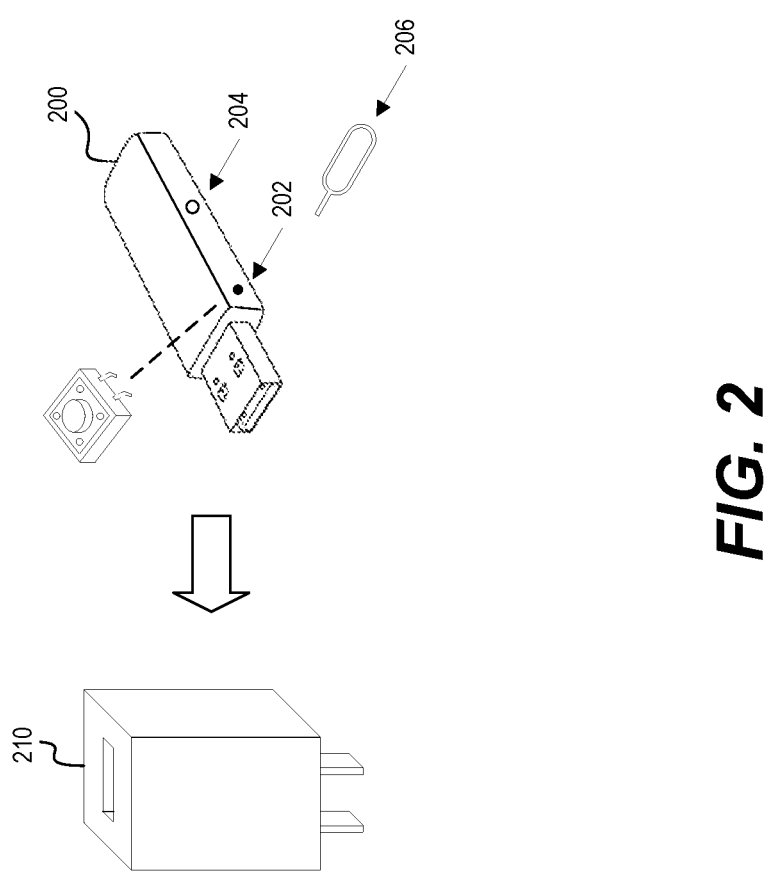
FIG. 2 is a block diagram illustrating an example data storage device for providing host-independent format operations and associated components, in accordance with one or more embodiments.

FIG. 2 illustrates an example data storage device 200 for providing host-independent format operations, in accordance with one or more embodiments. In some embodiments, components of FIG. 2 can be similar to components of FIG. 1 having similar names and/or reference numbers. For example, the data storage device 200 can be similar to the data storage device 100 in FIG. 1. Certain details relating to the data storage device 200 are described above in connection with FIG. 1.

As in the example of FIG. 2, the data storage device 200 can be a USB flash drive or memory stick. The storage device 200 can include a pinhole button 202. The pinhole button 202 can be pressed to initiate a format operation. For example, the pinhole button 202 can be pressed with a pin 206 that is provided by with the storage device 200. The pinhole button 202 can be pressed for a specified duration or threshold period in order to initiate a format operation. The storage device 200 can determine whether it is connected to a power supply 210 (e.g., DC power supply/adapter/power bank, etc.), and if the storage device 200 is connected to a power supply 210, a format operation can be initiated. A format operation can include formatting of the storage device 200 or factory reset of the storage device 200, depending on the embodiment. Formatting of the storage device 200 can delete data on the storage device 200. Factory reset of the storage device 200 can include formatting and additional functionalities. Additional functionalities can include deleting any partitions on the storage device 200 and/or resetting any user preferences to restore the storage device 200 to factory settings. Initiation of a format operation and performing the format operation do not require a connection to a host. The storage device 200 can stay connected to the power supply 210 while the format operation is performed. The storage device 200 can also include an indicator 204, such as an LED indicator. The indicator 204 can provide status information relating to a format operation. The indicator 204 can show whether a format operation is in progress or completed. For instance, the LED can be turned on when a format operation starts, stay on while the format operation is in progress, and turn off when the format operation is completed. After the format operation is completed, the storage device 200 may be disconnected from the power supply 210.

Various types of buttons or switches may be used to implement the pinhole button 202. Examples of buttons or switches can include push buttons, toggle buttons, momentary switches, etc. A push button can be pressed and stay in a pressed position (e.g., stuck). The push button can be pressed again and return to a normal position. A toggle button can be pressed and return to a normal position. When the push button or the toggle button is pressed, an interrupt or a command can be sent to a controller, and an associated functionality can be performed. Any suitable button or switch can be used. The pinhole button 202 can be placed inside the storage device 200 and pressed through the pinhole or aperture such that the button is not inadvertently pressed to trigger a format operation. As an example, the pinhole button 202 can be placed inside the lid set of a USB flash drive. The pinhole button 202 can be connected to a printed circuit board (PCB). In some embodiments, the pinhole button 202 may be placed on the exterior of the storage device 200.

A press effect of the pinhole button 202 can vary depending on the embodiment. For instance, the pinhole button 202 can be sticky or not sticky when pressed. If the press effect of the pinhole button 202 is sticky, an associated action or functionality cannot be undone or canceled by pressing the pinhole button 202 again. If the press effect of the pinhole button 202 is not sticky, an associated action or functionality may be undone or canceled by pressing the pinhole button 202 again. In some cases, the pinhole button 202 can be stuck to a pressed position to avoid resetting an associated functionality by mistake or to prevent misuse of the pinhole button 202.

The pinhole button 202 may be configured to perform various functionalities based on press duration or press count. For instance, a short press of the pinhole button 202 can be associated with a first functionality, and a long press of the pinhole button 202 can be associated with a second functionality. The short press and the long press can be defined to have a corresponding duration (e.g., a specified number of seconds, etc.). An appropriate number of durations can be defined and used depending on the number of functionalities available. For instance, if three functionalities are available, a short press, a medium press, and a long press may be defined. In some instances, press count can be associated with different functionalities or activating/deactivating a functionality. Multiple presses may be used to activate or deactivate a functionality. Double presses or triple presses may be used as appropriate. Many variations are possible.

The pinhole button 202 can be configured to function in various manners. As an example, if the pinhole button 202 is pressed in a powered-on state of the storage device 200, the pinhole button 202 can be back to a normal position, but can stop functioning for subsequent presses until performing the associated functionality is completed. In this way, errors resulting from further presses of the pinhole button 202 by a user can be prevented. As another example, if the pinhole button 202 is pressed in a powered-off state of the storage device 200, the pinhole button 202 can be stuck and remain in a pressed position. When the storage device 200 is powered on next time, the storage device 200 can check the button status of the pinhole button 202 and initiate an associated functionality. After initiating the associated functionality, the pinhole button 202 can be released to a normal position, but can stop functioning for subsequent presses until performing the associated functionality is completed. In some embodiments, further interrupts generated by pressing of the pinhole button 202 can be handled by the firmware, for example, by ignoring subsequent instructions after receiving an initial instruction.

To proceed with a format operation through pressing of the pinhole button 202, the storage device 200 can determine whether the storage device 200 is connected to a power supply 210 that can provide power to the storage device 200. As an example, the power supply 210 can be a 5V DC power supply (e.g., adapter). In some embodiments, the power supply 210 is a wall charger 210, such as a USB charger that includes a USB port for charging USB devices. Any appropriate power supply may be used. In some cases, a compliant battery or a rechargeable power bank can be used. In some embodiments, the power supply 210 can be an AC adapter. In certain embodiments, the storage device 200 may include a battery.

The storage device 200 may be coupled to a host for various data operations. For instance, a USB male port/connector of a USB storage device can be connected to a USB female port/connector of a host. USB storage devices can operate on 5V DC input current supplied via USB female ports of hosts. Examples of hosts can include a computer, a laptop, a mobile phone, etc. In some cases, a USB storage device may be coupled to a mobile phone via an On-The-Go (OTG) cable. A standard USB (type-A) port can have four (4) pins. Two (2) pins can be used for power, and two (2) pins can be used for data transfer. A description of the four pins is provided below in Table 1.

TABLE 1

Example USB Pin Descriptions

| Pin No. | Pin Name | Pin Description |
|---------|----------|-----------------|
| 1 | VCC | +5 V Power Pin |
| 2 | D− | Differential Pair D− of Data Pin |
| 3 | D+ | Differential Pair D+ of Data Pin |
| 4 | Ground | Connects to Ground of Host |

Figure 3A:
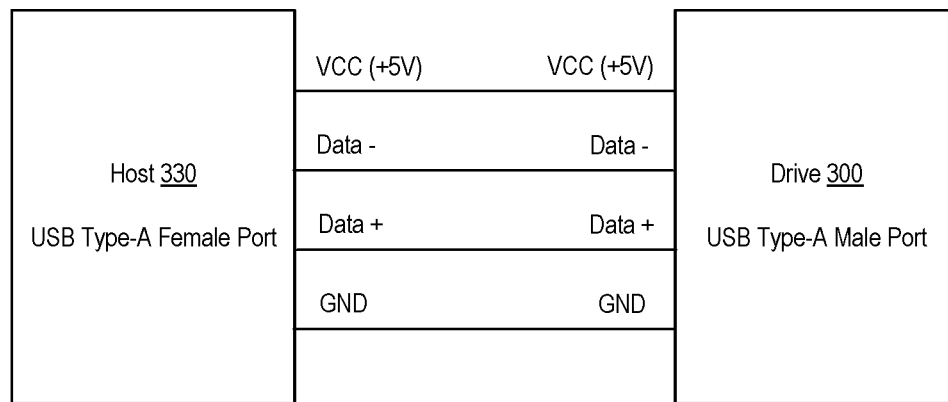
FIG. 3A shows a connection between a host and a USB storage device, in accordance with one or more embodiments.

FIG. 3A shows a connection between a host 330 and a USB storage device 300. The connection between the host 330 and the USB storage device 300 can utilize four pins, including two power pins (e.g., +5V power pin, ground pin) and two data pins (e.g., Data− and Data+ pins).

Figure 3B:
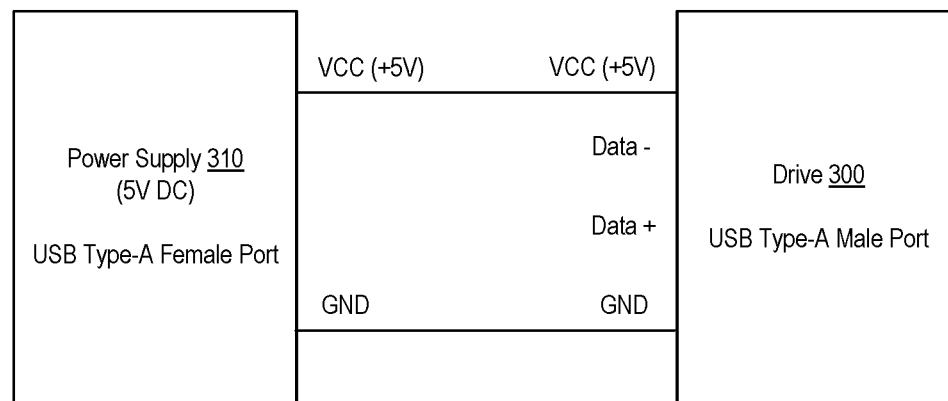
FIG. 3B shows a connection between a power supply and a USB storage device, in accordance with one or more embodiments.

The storage device 200 may also be coupled to a power supply 210, such as a wall charger. A 5V DC power supply/adapter can generally include power pins, but not include data pins. FIG. 3B shows a connection between a power supply (5V DC) 310 and a USB storage device 300. The connection between the power supply 310 and the USB storage device 300 can include two power pins (e.g., +5V power pin, ground pin). The storage device 200 can determine that the storage device 200 is connected to a power supply 210 and not a host when there is no data exchange happening.

The indicator 204 can provide status information relating to a format operation. The indicator 204 may use various methods to provide information relating to a format operation. For instance, the indicator 204 can be an LED indicator. As an example, the LED can be turned on while a format operation is performed and turned off when the format operation is completed. As another example, the LED can blink or use different colors to provide status information. The LED can use different blink rates or different colors to convey information. Various types of indicators may be used, for example, including one or more of LEDs, a screen, an electrochromic display, an electronic sound or speaker module, etc.

For illustrative purposes, host-independent format operations are described in connection with a USB flash drive, but host-independent format operations can be appliable to any type of data storage device. For instance, host-independent format operations can be applicable to any storage device that includes at least one USB interface. Examples of storage devices can include external or portable storage devices, such as a solid state drive (SSD). Details relating to format operations are provided below, for example, in connection with FIGS. 5-6.

Figure 4:
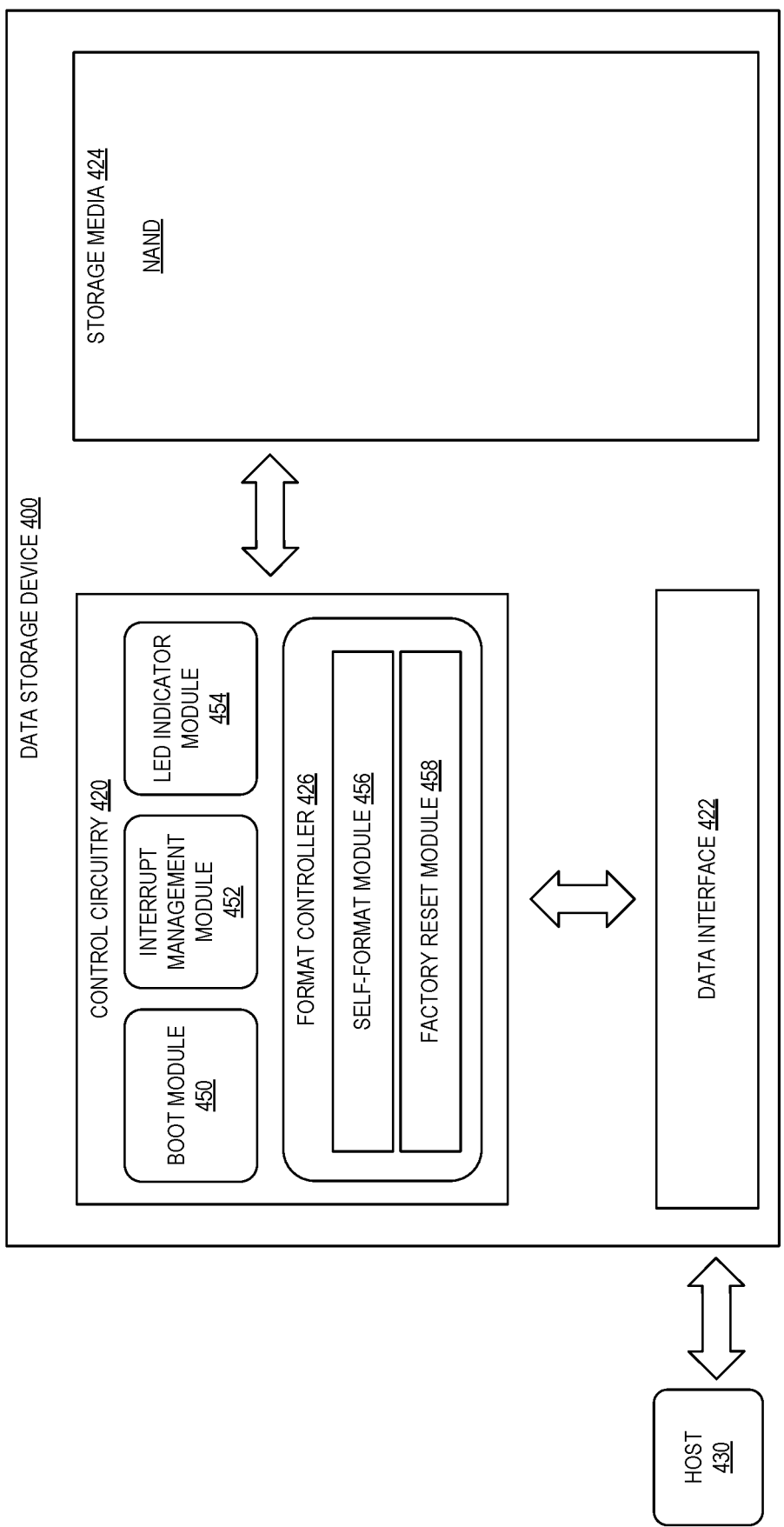
FIG. 4 is a block diagram illustrating an example data storage device for providing host-independent format operations, in accordance with one or more embodiments.

FIG. 4 is a block diagram illustrating an example data storage device 400 for providing host-independent format operations, in accordance with one or more embodiments. In some embodiments, components of FIG. 4 can be similar to components of FIGS. 1-2 having similar names and/or reference numbers. For example, the data storage device 400 can be similar to the data storage device 100, 200 in FIGS. 1-2. Certain details relating to the data storage device 400 are described above in connection with FIGS. 1-2.

The data storage device 400 can include control circuitry 420, a data interface 422, and storage media 424. The storage device 400 may connect to and communicate with a host 430 through the data interface 422. The control circuitry 420 can include a boot module 450, an interrupt management module 452, an LED indicator module 454, and a format controller 426. The boot module 450 can manage the booting process for the storage device 400. The boot module 450 may determine whether the storage device 400 is connected to a host 430 or a power supply. For example, the boot module 450 can determine that the storage device 400 is connected to a host 430 when there is data transfer or device discovery related message exchange, or device capability discovery related handshake. The boot module 450 can determine that the storage device 400 is connected to a power supply that is not a host when there is no data transfer or exchange or handshake. The interrupt management module 452 can manage interrupts associated with the storage device 400. Interrupts may be masked or temporarily disabled. For instance, the interrupt management module 452 can mask some or all interrupts while a format operation is being performed. The interrupt management module 452 can unmask some or all interrupts after the format operation is completed. The LED indicator module 454 can manage one or more LEDs. For example, the LED indicator module 454 can turn one or more LEDs on or off, have one or more LEDs blink, etc. in order to provide status information relating to the format operation. The format controller 426 can include a self-format module 456 and a factory reset module 458. The self-format module 456 can perform formatting of the storage device 400. The factory reset module 458 can perform factory reset of the storage device 400. For instance, factory reset can include formatting and additional functionalities, such as deleting partitions and resetting user preferences. In certain embodiments, the factory reset module 458 can reset user preferences without deleting data and/or partitions. The storage media 424 can include NAND memory. NAND memory can be organized in one or more blocks. The storage device 400 and/or the control circuitry 420 may include additional or fewer components, depending on the embodiment. One or more components of the storage device 400 and/or the control circuitry 420 may be combined or implemented separately, depending on the embodiment.

Formatting Process

Figure 5:
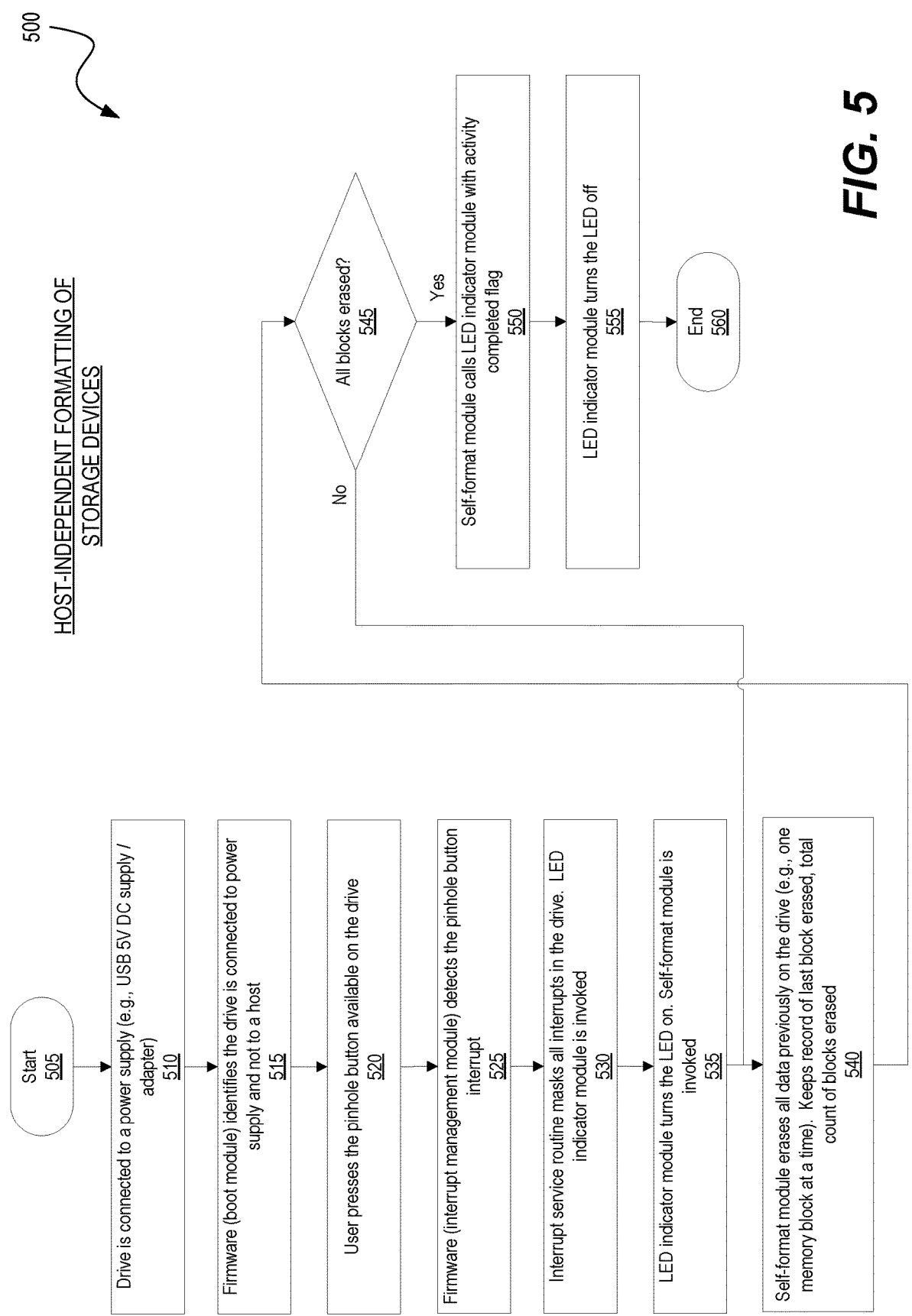
FIG. 5 illustrates a workflow process for providing host-independent formatting in a data storage device, in accordance with one or more embodiments.

FIG. 5 illustrates a workflow process 500 for providing host-independent formatting in a data storage device, in accordance with one or more embodiments. The workflow process 500 may be implemented by a data storage device, such as a data storage device 100, 200, 400 in FIGS. 1-4. For example, the workflow process 500 may be performed in part or in whole by a controller of a data storage device. For illustrative purposes, the process 500 is explained below in connection with the data storage device 400 in FIG. 4. Certain details relating to the process 500 are explained in more detail with respect to FIGS. 1-4. Depending on the embodiment, the process 500 may include fewer or additional blocks, and the blocks may be performed in an order that is different from illustrated.

The process 500 starts at block 505. At block 510, the data storage device 400 is connected to a power supply. For example, the power supply can be a USB 5V DC power supply/adapter. At block 515, the firmware (e.g., the boot module 450) can identify that the storage device 400 is connected to a power supply and not to a host. For example, the boot module 450 can be executed when the storage device 400 is connected to the power supply. The firmware can check whether the storage device 400 is connected to a host or a power supply, for example, based on a USB handshake protocol. If there is no data transfer or message exchange, the firmware can determine that the storage device 400 is connected to a power supply. At block 520, a user presses the pinhole button available on the storage device 400. At block 525, the firmware (e.g., the interrupt management module 452) can detect the pinhole button interrupt. At block 530, the interrupt service routine masks all interrupts in the storage device 400, and the LED indicator module 454 is invoked.

At block 535, the LED indicator module 454 can turn on the LED, and the self-format module 456 is invoked to initiate formatting. At block 540, the self-format module 456 can erase all data previously on the storage device 400. The data can be erased one block at a time, and the storage device 400 can keep track of the last block erased and the total number of blocks erased. If power is disconnected during the formatting process, an error condition can result, and the storage device 400 can keep track of blocks that are erased so that the storage device 400 can continue erasing remaining blocks once power is restored. For instance, if an error condition results and formatting is initiated again at a subsequent time, the storage device 400 may continue erasing remaining blocks. At block 545, the storage device 400 can determine whether all blocks are erased. If all blocks are not erased at block 545, the process 500 can return to block 540 and continue erasing blocks one by one. If all blocks are erased at block 545, the process 500 can continue to block 550. At block 550, the self-format module 456 can call the LED indicator module 454 with activity completed flag. At block 555, the LED indicator module 454 turn off the LED. All interrupts can be unmasked after the formatting is completed. The process 500 ends at block 560.

Figure 6:
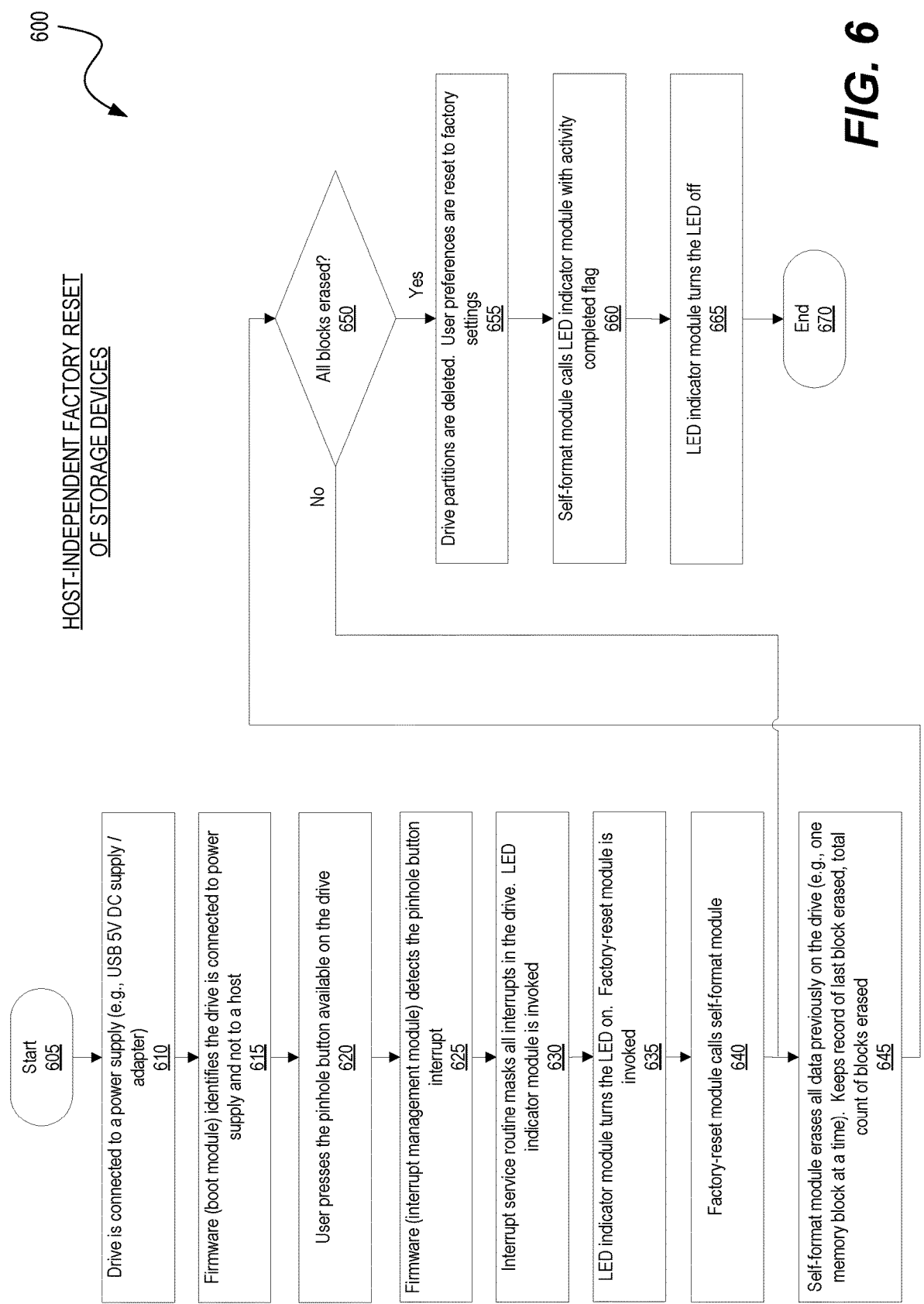
FIG. 6 illustrates a workflow process for providing host-independent factory reset in a data storage device, in accordance with one or more embodiments.

FIG. 6 illustrates a workflow process 600 for providing host-independent factory reset in a data storage device, in accordance with one or more embodiments. The workflow process 600 may be implemented by a data storage device, such as a data storage device 100, 200, 400 in FIGS. 1-5. For example, the workflow process 600 may be performed in part or in whole by a controller of a data storage device. For illustrative purposes, the process 600 is explained below in connection with the data storage device 400 in FIG. 4. Certain details relating to the process 600 are explained in more detail with respect to FIGS. 1-5. Depending on the embodiment, the process 600 may include fewer or additional blocks, and the blocks may be performed in an order that is different from illustrated.

The process 600 starts at block 605. At block 610, the data storage device 400 is connected to a power supply. For example, the power supply can be a USB 5V DC power supply/adapter. At block 615, the firmware (e.g., the boot module 450) can identify that the storage device 400 is connected to a power supply and not to a host. For example, the boot module 450 can be executed when the storage device 400 is connected to the power supply. The firmware can check whether the storage device 400 is connected to a host or a power supply, for example, based on a USB handshake protocol. If there is no data transfer or message exchange, the firmware can determine that the storage device 400 is connected to a power supply. At block 620, a user presses the pinhole button available on the storage device 400. At block 625, the firmware (e.g., the interrupt management module 452) can detect the pinhole button interrupt. At block 630, the interrupt service routine masks all interrupts in the storage device 400, and the LED indicator module 454 is invoked.

At block 635, the LED indicator module 454 can turn on the LED, and the factory reset module 458 is invoked to initiate factory reset. At block 640, the factory reset module 458 calls the self-format module 456 to initiate formatting. At block 645, the self-format module 456 can erase all data previously on the storage device 400. The data can be erased one block at a time, and the storage device 400 can keep track of the last block erased and the total number of blocks erased. If power is disconnected during the formatting process, an error condition can result, and the storage device 400 can keep track of blocks that are erased so that the storage device 400 can continue erasing remaining blocks once power is restored. For instance, if an error condition results and formatting and/or factory reset is initiated again at a subsequent time, the storage device 400 may continue erasing remaining blocks. At block 650, the storage device 400 can determine whether all blocks are erased. If all blocks are not erased at block 650, the process 600 can return to block 645 and continue erasing blocks one by one. If all blocks are erased at block 650, the process 600 can continue to block 655. At block 655, the factory reset module 458 can delete drive partitions and reset user preferences to factory settings. At block 660, the self-format module 456 can call the LED indicator module 454 with activity completed flag. At block 665, the LED indicator module 454 turn off the LED. All interrupts can be unmasked after the factory reset is completed. The process 600 ends at block 670.

In some cases, factory reset may not include formatting and only delete partitions and/or reset user preferences without formatting the storage device 400. In such cases, the process 600 can proceed from block 635 to block 655, and the factory reset module 458 does not call the self-format module 456. At block 655, the factory reset module 458 can delete drive partitions and reset user preferences to factory settings. At block 660, the factory reset module 458 can call the LED indicator module 454 with activity completed flag.

Storage devices for providing host-independent format operations can enable users to initiate and perform format operations without having access to a host device. A storage device can be connected to a power supply, and format operations can be initiated by pressing a pinhole button on the storage device. Host-independent format operations can be useful in many cases, including when using storage devices with hosts that may not have antivirus software installed. If a storage device could potentially be infected from using with a host device (e.g., a public host device), the user can easily format the storage device before using it with another host device and ensure that the storage device is safe to use with another host device. In this way, storage devices for providing host-independent format operations can also reduce risk of data theft and ensure data privacy. For instance, USB flash drives may be shared or used by multiple users, and users can format the drives before giving them to other users or after receiving them from other users. Examples described herein are provided for illustrative purposes, and many variations are possible. Features described in connection with various embodiments and/or examples may be implemented separately or in combination.

Figure 7:
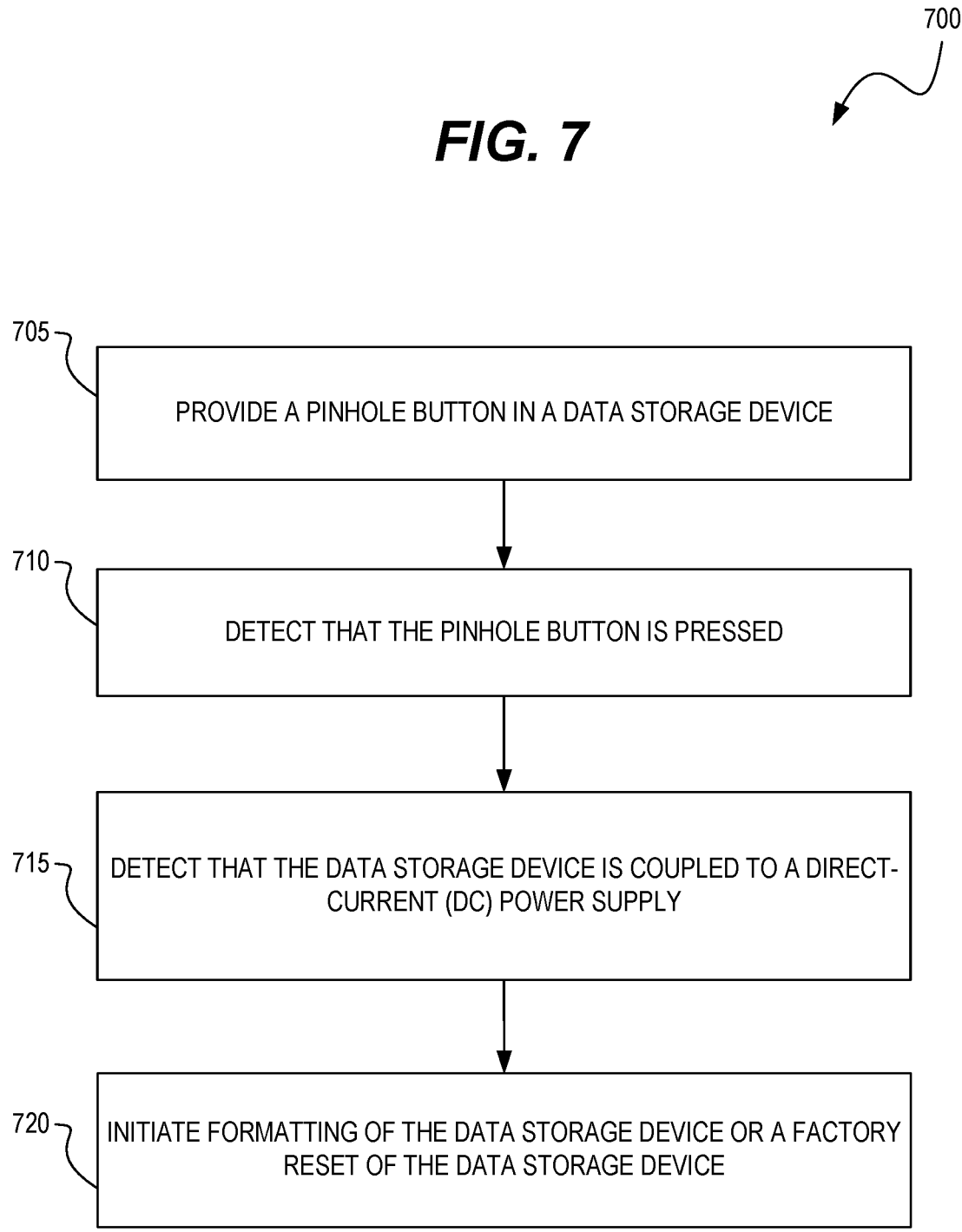
FIG. 7 illustrates a workflow process for providing host-independent format operations in a data storage device, in accordance with one or more embodiments.

FIG. 7 illustrates a workflow process 700 for providing host-independent format operations in a data storage device, in accordance with one or more embodiments. The workflow process 700 may be implemented by a data storage device, such as a data storage device 100, 200, 400 in FIGS. 1-6. For example, the workflow process 700 may be performed in part or in whole by a controller of a data storage device. For illustrative purposes, the process 700 is explained below in connection with the data storage device 200 in FIG. 2. Certain details relating to the process 700 are explained in more detail with respect to FIGS. 1-6. Depending on the embodiment, the process 700 may include fewer or additional blocks, and the blocks may be performed in an order that is different from illustrated.

At block 705, the data storage device 200 can provide a pinhole button 202 in the data storage device 200. For example, the pinhole button 202 can be pressed by a user to initiate formatting of the data storage device 200 or a factory reset of the data storage device 200. In some embodiments, the data storage device 200 can include a pin 206 for pressing the pinhole button 202. The data storage device 200 can include a Universal Serial Bus (USB) interface. The data storage device 200 can include a light-emitting diode (LED) indicator 204 for providing status information relating to the formatting or the factory reset. The data storage device 200 can turn on the LED indicator 204 in response to initiating the formatting or the factory reset. The data storage device 200 can turn off the LED indicator 204 in response to completing the formatting or the factory reset.

At block 710, the data storage device 200 can detect that the pinhole button 202 is pressed. In some embodiments, the data storage device 200 can detect that the pinhole button is pressed by receiving an interrupt, and the data storage device 200 can mask all interrupts to initiate the formatting or the factory reset.

At block 715, the data storage device 200 can detect that the data storage device 200 is coupled to a direct-current (DC) power supply 210. The DC power supply 210 can include one or more of: a wall charger, a power bank, or a rechargeable battery.

At block 720, the data storage device 200 can initiate formatting of the data storage device 200 or a factory reset of the data storage device 200. For example, the factory reset of the data storage device 200 can include deleting partitions on the data storage device 200 and resetting user preferences, for instance, in addition to formatting of the data storage device 200. According to certain aspects, the data storage device 200 does not receive a command from a host to initiate the formatting or the factory reset of the data storage device 200. According to certain aspects, the data storage device 200 is not connected to a host during the formatting or the factory reset of the data storage device 200. In some embodiments, the factory reset of the data storage device 200 includes formatting of the data storage device 200. In certain embodiments, the factory reset of the data storage device 200 does not include formatting of the data storage device 200. In some embodiments, the formatting of the data storage device 200 can perform formatting of a selected partition on the data storage device 200. In certain embodiments, the formatting of the data storage device 200 can perform a full format of the data storage device 200.

Figure 8:
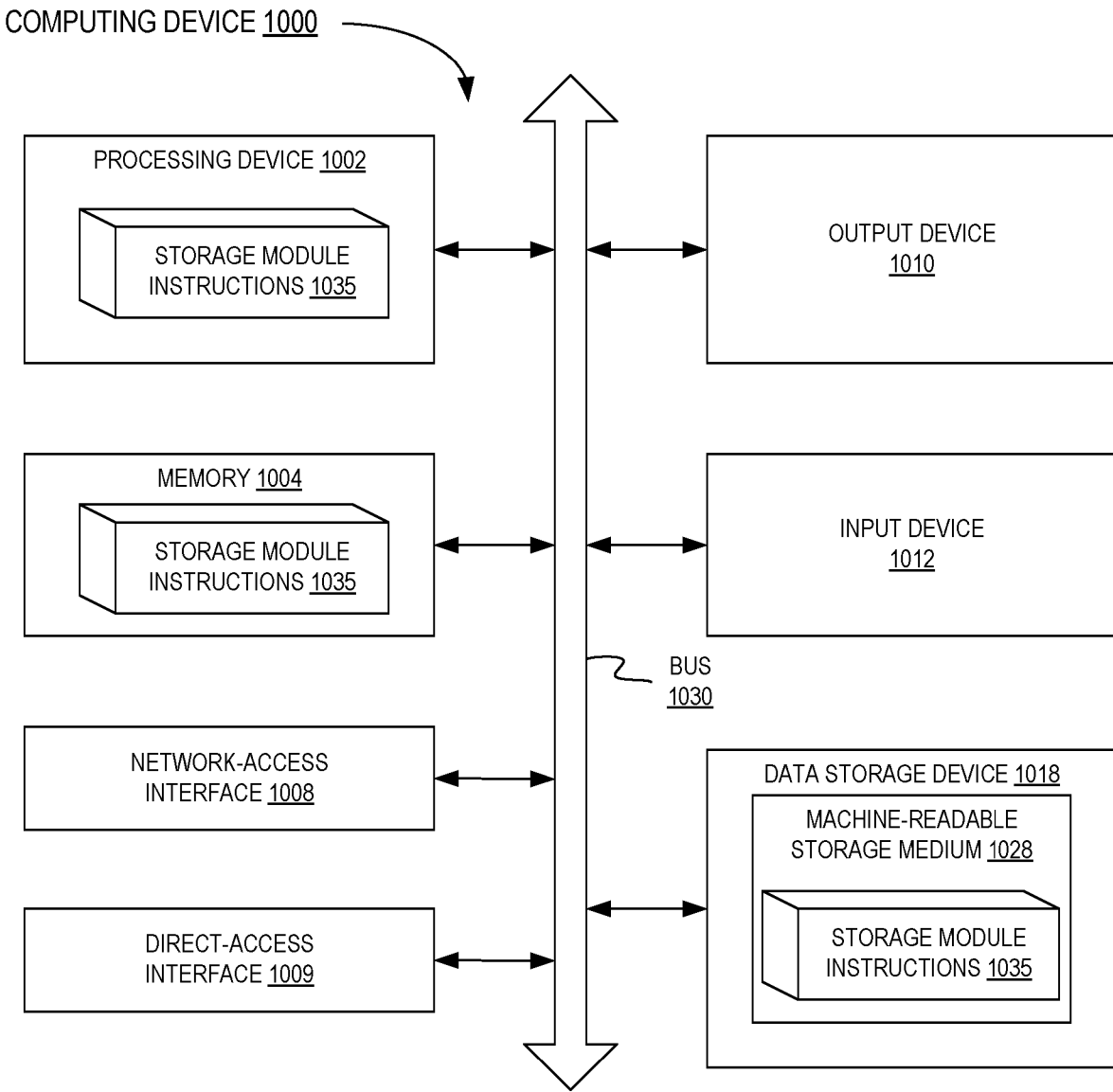
FIG. 8 is a diagram of a computing device, in accordance with one or more embodiments.

FIG. 8 is a diagram of a computing device 1000, in accordance with one or more embodiments. The computing device 1000 may execute instructions that may cause the computing device 1000 to perform any one or more of the methodologies (e.g., operations, methods, functions, etc.) discussed herein. The computing device 1000 may be a mobile phone, a smart phone, a netbook computer, a rack-mount server, a router computer, a server computer, a personal computer, a mainframe computer, a laptop computer, a tablet computer, a desktop computer etc., within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the functions, operations, methods, algorithms, etc., discussed herein.

The example computing device 1000 includes a processing device 1002 (e.g., a processor, a controller, a central processing unit (CPU), etc.), a main memory 1004 (e.g., read-only memory (ROM), flash memory, dynamic random-access memory (DRAM) such as synchronous DRAM (SDRAM)), a network-access interface 1008, a direct-access interface 1009, an output device 1010, an input device 1012, and a data storage device 1018, which communicate with each other via a bus 1030.

Processing device 1002 represents one or more general-purpose processing devices such as a microprocessor, central processing unit, or the like. More particularly, the processing device 1002 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1002 may also be one or more special-purpose processing devices such as an application specific integrated circuit (ASIC), a field programmable gate array (FPGA), a digital signal processor (DSP), network processor, or the like. The processing device 1002 is configured to execute storage module instructions 1035 for performing the operations and steps discussed herein.

The computing device 1000 may include a network-access interface 1008 (e.g., a network interface card, a Wi-Fi interface, etc.) which may communicate with a network. The computing device may also include a direct-access interface 1009 (e.g., a USB interface, an external Serial Advanced Technology Attachment (eSATA) interface, a Thunderbolt interface, etc.). The computing device 1000 may also include an output device 1010 (e.g., a liquid crystal display (LCD) or a cathode ray tube (CRT)), and an input device 1012 (e.g., a mouse, a keyboard, etc.). In one embodiment, the output device 1010 and the input device 1012 may be combined into a single component or device (e.g., an LCD touch screen).

The data storage device 1018 may include a computer-readable storage medium 1028 on which is stored one or more sets of instructions (e.g., storage module instructions 1035) embodying any one or more of the methodologies or functions described herein. The storage module instructions 1035 may also reside, completely or at least partially, within the main memory 1004 and/or within the processing device 1002 during execution thereof by the computing device 1000. The main memory 1004 and the processing device 1002 may also constitute computer-readable media. The instructions may further be transmitted or received over via the network-access interface 1008 and/or direct-access interface 1009.

While the computer-readable storage medium 1028 is shown in an example embodiment to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media and magnetic media.

General Comments

Those skilled in the art will appreciate that in some embodiments, other types of data storage systems can be implemented while remaining within the scope of the present disclosure. In addition, the actual steps taken in the processes discussed herein may differ from those described or shown in the figures. Depending on the embodiment, certain of the steps described above may be removed, others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure.

Accordingly, the scope of the present disclosure is intended to be defined only by reference to the appended claims.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc., as used herein are meant as labels to distinguish among different elements and may not necessarily have an ordinal meaning according to their numerical designation.

Methods and processes described herein may be embodied in, and partially or fully automated via, software code modules executed by one or more general and/or special purpose computers/processors. The word "module" may refer to logic embodied in hardware and/or firmware, or to a collection of software instructions, possibly having entry and exit points, written in a programming language, such as, for example, C or C++. A software module may be compiled and linked into an executable program, installed in a dynamically linked library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an erasable programmable read-only memory (EPROM). The software instructions may be stored on any type of computer-readable medium (e.g., a non-transitory computer-readable medium) or other computer storage device or collection of storage devices. "Module" may further refer to one or more devices, components, systems, or subsystems, which may conceptually implement relevant functionality. It will be further appreciated that hardware modules may be comprised of connected logic units, such as gates and flip-flops, and/or may be comprised of programmable units, such as programmable gate arrays, application specific integrated circuits, and/or processors. The modules described herein are preferably implemented as software modules, but may be represented in hardware and/or firmware. Moreover, although in some embodiments a module may be separately compiled, in other embodiments a module may represent a subset of instructions of a separately compiled program, and may not have an interface available to other logical program units.

What is claimed is:

1. A data storage device comprising:
   a non-volatile memory;
   a pinhole button configured to be pressed; and
   a controller configured to:
      detect that the pinhole button is pressed by receiving an interrupt;
      detect that the data storage device is coupled to a direct-current (DC) power supply;
      initiate formatting of the data storage device or a factory reset of the data storage device; and
      mask all interrupts to initiate the formatting or the factory reset.

2. The data storage device of claim 1, wherein the data storage device includes a Universal Serial Bus (USB) interface.

3. The data storage device of claim 1, wherein the factory reset of the data storage device includes deleting partitions on the data storage device and resetting user preferences.

4. The data storage device of claim 1, wherein the factory reset of the data storage device includes formatting of the data storage device.

5. The data storage device of claim 1, wherein the factory reset of the data storage device does not include formatting of the data storage device.

6. The data storage device of claim 1, wherein the DC power supply includes one or more of: a wall charger, a power bank, or a rechargeable battery.

7. The data storage device of claim 1, wherein the data storage device does not receive a command from a host to initiate the formatting or the factory reset.

8. The data storage device of claim 1, wherein the data storage device is not connected to a host during the formatting or the factory reset.

9. The data storage device of claim 1, further comprising a light-emitting diode (LED) indicator for providing status information relating to the formatting or the factory reset.

10. The data storage device of claim 9, wherein the controller is further configured to:
    turn on the LED indicator in response to initiating the formatting or the factory reset; and
    turn off the LED indicator in response to completing the formatting or the factory reset.

11. The data storage device of claim 1, further comprising a pin for pressing the pinhole button.

12. The data storage device of claim 1, wherein the formatting of the data storage device performs formatting of a selected partition on the data storage device.

13. The data storage device of claim 1, wherein the formatting of the data storage device performs a full format of the data storage device.

14. A method of performing formatting or a factory reset in a data storage device, the method comprising:
    providing a data storage device including a non-volatile memory and a pinhole button configured to be pressed;
    detecting that the pinhole button is pressed by receiving an interrupt;
    detecting that the data storage device is coupled to a direct-current (DC) power supply;
    initiating formatting of the data storage device or a factory reset of the data storage device; and
    masking all interrupts to initiate the formatting or the factory reset.

15. The method of claim 14, wherein the data storage device includes a Universal Serial Bus (USB) interface.

16. The method of claim 14, wherein the factory reset of the data storage device includes deleting partitions on the data storage device and resetting user preferences.

17. The method of claim 14, wherein the DC power supply includes one or more of: a wall charger, a power bank, or a rechargeable battery.

18. The method of claim 14, wherein the data storage device further includes a light-emitting diode (LED) indicator for providing status information relating to the formatting or the factory reset.

19. A data storage device comprising:
   a non-volatile memory;
   a pinhole button configured to be pressed; and
   a controller means configured to:
      detect that the pinhole button is pressed by receiving an interrupt;
      detect that the data storage device is coupled to a direct-current (DC) power supply;
      initiate formatting of the data storage device or a factory reset of the data storage device; and
      mask all interrupts to initiate the formatting or the factory reset.

\* \* \* \* \*